(12) United States Patent
Kim et al.

(10) Patent No.: US 12,157,492 B2
(45) Date of Patent: Dec. 3, 2024

(54) CONTROL METHOD FOR DRIVING U-TURN USING HIGH-DEFINITION MAP

(71) Applicants: Hyundai Motor Company, Seoul (KR); Kia Corporation, Seoul (KR)

(72) Inventors: Hee Gwon Kim, Seoul (KR); Su Jin Han, Seoul (KR); Hyun Kyu Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 618 days.

(21) Appl. No.: 17/482,819

(22) Filed: Sep. 23, 2021

(65) Prior Publication Data
US 2022/0089180 A1 Mar. 24, 2022

(30) Foreign Application Priority Data
Sep. 23, 2020 (KR) .......................... 10-2020-0122916

(51) Int. Cl.
*B60W 60/00* (2020.01)
*B60W 30/09* (2012.01)

(52) U.S. Cl.
CPC .......... *B60W 60/001* (2020.02); *B60W 30/09* (2013.01); *B60W 2510/20* (2013.01); *B60W 2520/10* (2013.01); *B60W 2520/12* (2013.01); *B60W 2552/10* (2020.02); *B60W 2552/30* (2020.02); *B60W 2710/20* (2013.01); *B60W 2720/106* (2013.01); *B60W 2720/125* (2013.01)

(58) Field of Classification Search
None
See application file for complete search history.

(56) References Cited

U.S. PATENT DOCUMENTS

| | | | |
|---|---|---|---|
| 2019/0084571 A1* | 3/2019 | Zhu | B60W 30/18163 |
| 2021/0096573 A1* | 4/2021 | Yu | G05D 1/0219 |
| 2022/0326714 A1* | 10/2022 | Goyal | B60W 60/0027 |

* cited by examiner

*Primary Examiner* — Christian Chace
*Assistant Examiner* — Katherine Marie Fitzharris
(74) *Attorney, Agent, or Firm* — Morgan, Lewis & Bockius LLP

(57) ABSTRACT

A method for controlling a U-turn using a high-definition map may include recognizing a U-turn section in front of a vehicle on the basis of sensor information, detecting a first point in the U-turn section using a high-definition map, determining at least one candidate lane link on the high-definition map and selecting a target lane link from the at least one candidate lane link, determining a second point on the target lane link on the basis of the first point, and generating a dynamic curvature route based on the first point and the second point.

18 Claims, 4 Drawing Sheets

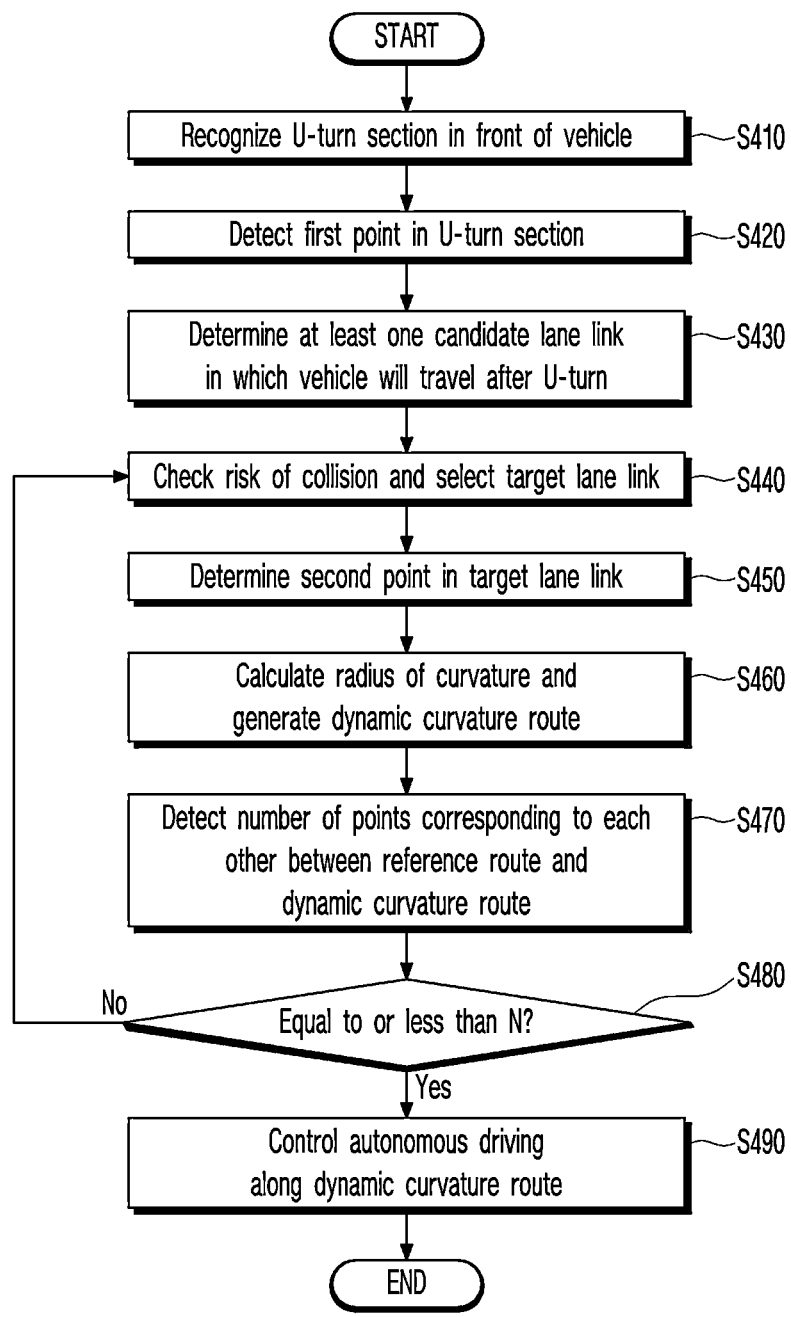

CONTROL METHOD FOR DRIVING U-TURN USING HIGH-DEFINITION MAP

CROSS-REFERENCE TO RELATED APPLICATION

The present application claims priority to Korean Patent Application No. 10-2020-0122916, filed on Sep. 23, 2020, the entire contents of which is incorporated herein for all purposes by this reference.

BACKGROUND OF THE INVENTION

Field of the Invention

The present invention relates to a control method for driving a U-turn using a high-definition map.

Description of Related Art

Autonomous vehicles can allow drivers to become free from simple tasks such as steering wheel and pedal operations while driving and prevent accidents caused by carelessness of drivers using an advanced driver assistance system (ADAS) and thus are increasingly attracting attention.

Such an autonomous vehicle generates a route using nodes, lane links, lane sides, etc. Forming high-definition maps and executes autonomous driving control following the route. Such a route is generally generated by re-processing vector data collected from high-definition maps through various function representations (n-order polynomial curves, B-spline, etc.) and sequentially using points of vector data.

However, the aforementioned route generation method may generate routes that are not suitable for actual driving because dynamic factors of vehicles are not reflected in route generation. For example, when a route is generated following only a high-definition map in a U-turn situation in which a plurality of lines corresponding to a combination of lane links are twisted or curve fitting according to a polynomial is difficult to perform, unnecessary steering change causes unnatural driving and considerable deterioration in ride comfort.

Accordingly, there is demand for a route generation method specialized for a U-turn situation in connection with dynamic factors of a vehicle while referring to a high-definition map.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling a U-turn using a high-definition map which can reduce discomfort of a passenger and allow more natural autonomous driving control by presenting a dynamic curvature route through which steering angle change can be minimized during a U-turn in connection with dynamic factors of a vehicle and a high-definition map.

It will be appreciated by persons skilled in the art that the objects that could be achieved with the present invention are not limited to what has been particularly described hereinabove and the above and other objects that the present invention could achieve will be more clearly understood from the following detailed description.

In various exemplary embodiments of the present invention, a method for controlling a U-turn using a high-definition map includes recognizing a U-turn section in front of a vehicle on the basis of sensor information, detecting a first point in the U-turn section using a high-definition map, determining at least one candidate lane link on the high-definition map and selecting a target lane link from the at least one candidate lane link, determining a second point on the target lane link on the basis of the first point, and generating a dynamic curvature route based on the first point and the second point.

The first point may be a point on a reference lane link corresponding to a current position of the vehicle among a plurality of lane links and may be determined in consideration of a current speed of the vehicle and a turning reference speed, and the target lane link may be parallel to the reference lane link.

The method may further include determining a steering angle of the vehicle using a radius of curvature in the dynamic curvature route and the turning reference speed.

The dynamic curvature route may correspond to a steady-state cornering trajectory.

The generating of the dynamic curvature route may include obtaining a reference route on the basis of the high-definition map, and determining whether points on the reference route correspond to points on the dynamic curvature route by comparing the points on the reference route with the points on the dynamic curvature route and controlling traveling of the vehicle according to a determination result.

The controlling of traveling of the vehicle may include aligning steering of the vehicle on the basis of the reference lane link, and controlling a deceleration or an acceleration of the vehicle in consideration of a maximum deceleration in a first section between a current position of the vehicle and the first point.

The controlling of traveling of the vehicle may include controlling turning of the vehicle along the dynamic curvature route on a basis of a determined steering angle in a section between the first point and the second point, wherein the determined steering angle may be kept uniform in the second section.

The controlling of traveling of the vehicle may include causing the target lane link to correspond to heading of the vehicle after the second section.

Furthermore, a vehicle according to various exemplary embodiments of the present invention includes a sensor information transmitter configured to obtain sensor information, and a turning route generator configured to generate a dynamic curvature route in a U-turn section in front of a vehicle upon recognition of the U-turn section according to the sensor information, wherein the turning route generator is configured to detect a first point in the U-turn section using a high-definition map, to determine at least one candidate lane link on the high-definition map and to select a target lane link from the at least one candidate lane link, to determine a second point on the target lane link on the basis of the first point, and to generate the dynamic curvature route based on the first point and the second point.

The methods and apparatuses of the present invention have other features and advantages which will be apparent from or are set forth in more detail in the accompanying drawings, which are incorporated herein, and the following

BRIEF DESCRIPTION OF THE DRAWINGS

FIG. 4 is a flowchart of a method for controlling a U-turn using a high-definition map according to various exemplary embodiments of the present invention.

Figure 1:
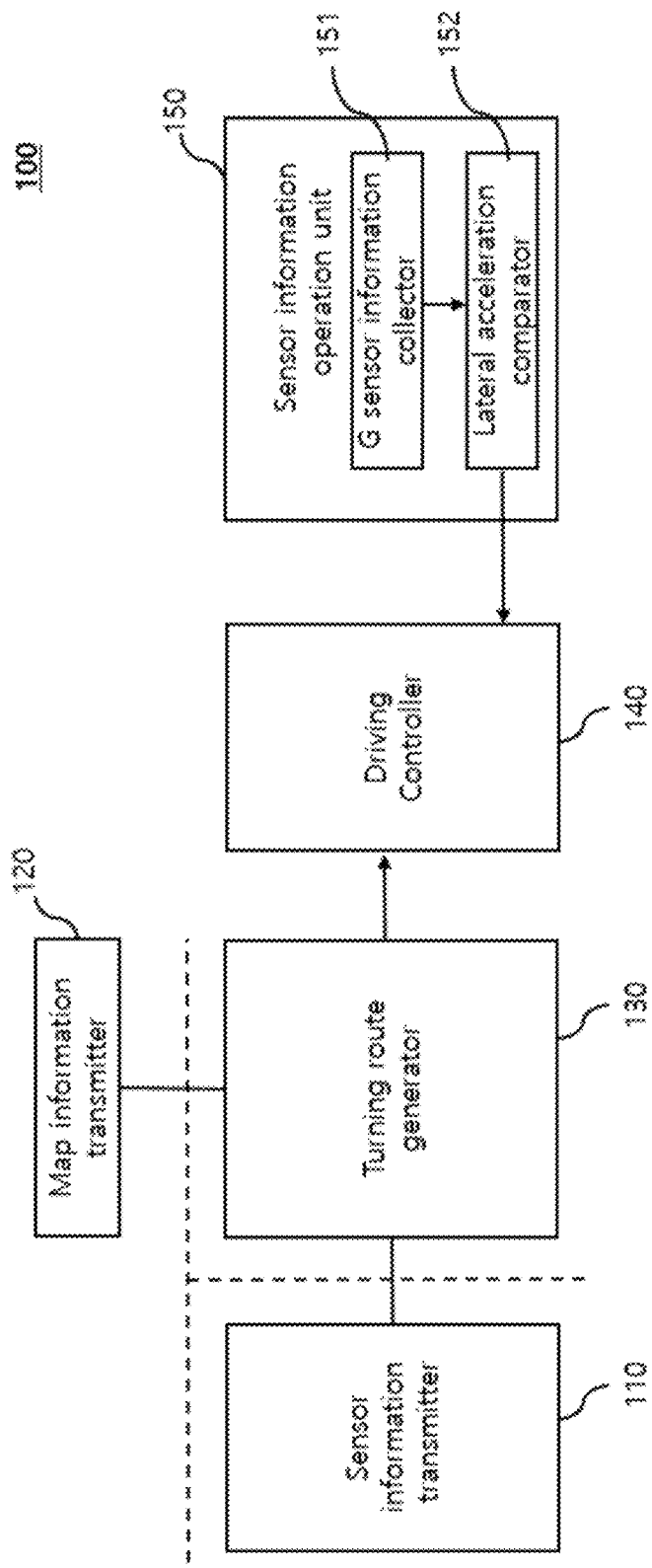
FIG. 1 is a block diagram illustrating a U-turn control apparatus using a high-definition map according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments will be described in detail with reference to the appended drawings. Embodiments may be modified in various manners and may have various forms, and specific embodiments will be illustrated in figures and described in detail. However, embodiments are not to be considered as a limitation of a specific included form, and the scope of the present invention is not to be limited by the exemplary embodiments but by the claims and the equivalents thereto.

Terms such as "first" and "second" may be used to describe various components but such components are not limited by the terms. The terms may be used to distinguish any one element from another element. Furthermore, terms specially defined in consideration of configurations and operations of embodiments are merely used to describe embodiments, and are not intended to limit the scope of the embodiments.

The terms used in the specification of the present invention are merely used to describe various exemplary embodiments of the present invention, and are not intended to limit the scope of the present invention. An element described in the singular form is intended to include a plurality of elements unless the context clearly indicates otherwise. In addition, in the specification of the present invention, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning which is consistent with their meaning in the context of the relevant art and should not be interpreted in an idealized or overly formal sense unless expressly so defined herein.

Hereinafter, a U-turn control apparatus using a high-definition map according to various exemplary embodiments of the present invention will be described with reference to the appended drawings.

FIG. 1 is a block diagram illustrating a U-turn control apparatus using a high-definition map according to various exemplary embodiments of the present invention.

Referring to FIG. 1, the U-turn control apparatus 100 using a high-definition map may include a sensor information transmitter 110, a map information transmitter 120, a turning route generator 130, a driving controller 140, and a sensor information operation unit 150.

The sensor information transmitter 110 may include an external sensor that detects environment information around a vehicle in real time and an internal sensor that measures state information of the vehicle, and the external sensor may include an image sensor provided on the front, lateral, and rear sides of the vehicle, a distance measurement sensor, a Global Positioning System (GPS) receiver, etc.

The image sensor may collect image information around the vehicle, captured through an optical system, and perform image processing such as noise removal, definition and chroma control, and file compression on the image information.

The distance measurement sensor may measure a distance or a relative speed between the vehicle and an object and may be implemented using radio detection and ranging (radar) or light detection and ranging (LiDAR). Radar is used to measure a distance to an object around a vehicle, a direction, a relative speed, and an altitude using electromagnetic waves and can identify a long distance and cope with bad weather. LiDAR generates LiDAR data in a form of points from laser pulses radiated to the side in front of a vehicle and then reflected on a road and is mainly used to detect an object around a vehicle using precise resolution thereof.

A GPS receiver is a sensor configured to estimate a geographical position of a vehicle and can collect current positions of a vehicle in real time by receiving navigation messages from a GPS satellite.

The internal sensor may include a speed sensor that detects a current speed of the vehicle, an acceleration sensor that detects an acceleration of the vehicle, and a steering angle sensor that detects a steering angle of the vehicle and may periodically measure state information related to various actuators.

The map information transmitter 120 may store road information related to shapes, curvatures, and gradients of roads, and high-definition maps including position information corresponding to the road information in a form of a database in advance.

A high-definition map may include road network data having nodes and lane links. Here, a node indicates a point at which attributes of a road change, such as a crossroad and a fork, and a lane link is a linear line between nodes and means a center line of a road. Such road network data includes information in units of road, in which physical characteristics of each road (e.g., a width, a curvature, a gradient, a grade, etc.) have been measured and converted into numerical values, and may be periodically and automatically updated through wireless communication or manually updated by a user.

The sensor information transmitter 110 and the map information transmitter 120 may communicate with the turning route generator 130 through a vehicle network NW. Here, the vehicle network NW may include various types of on-board communication such as a controller area network (CAN), CAN with Flexible Data rate (CAN-FD), FlexRay, Media Oriented Systems Transport (MOST), and Time Triggered (TT) Ethernet.

The turning route generator 130 may collect sensor information and high-definition maps transmitted through the vehicle network NW in real time and generate a dynamic curvature route. This will be described in more detail below with reference to FIG. 2 and FIG. 3.

Figure 2:
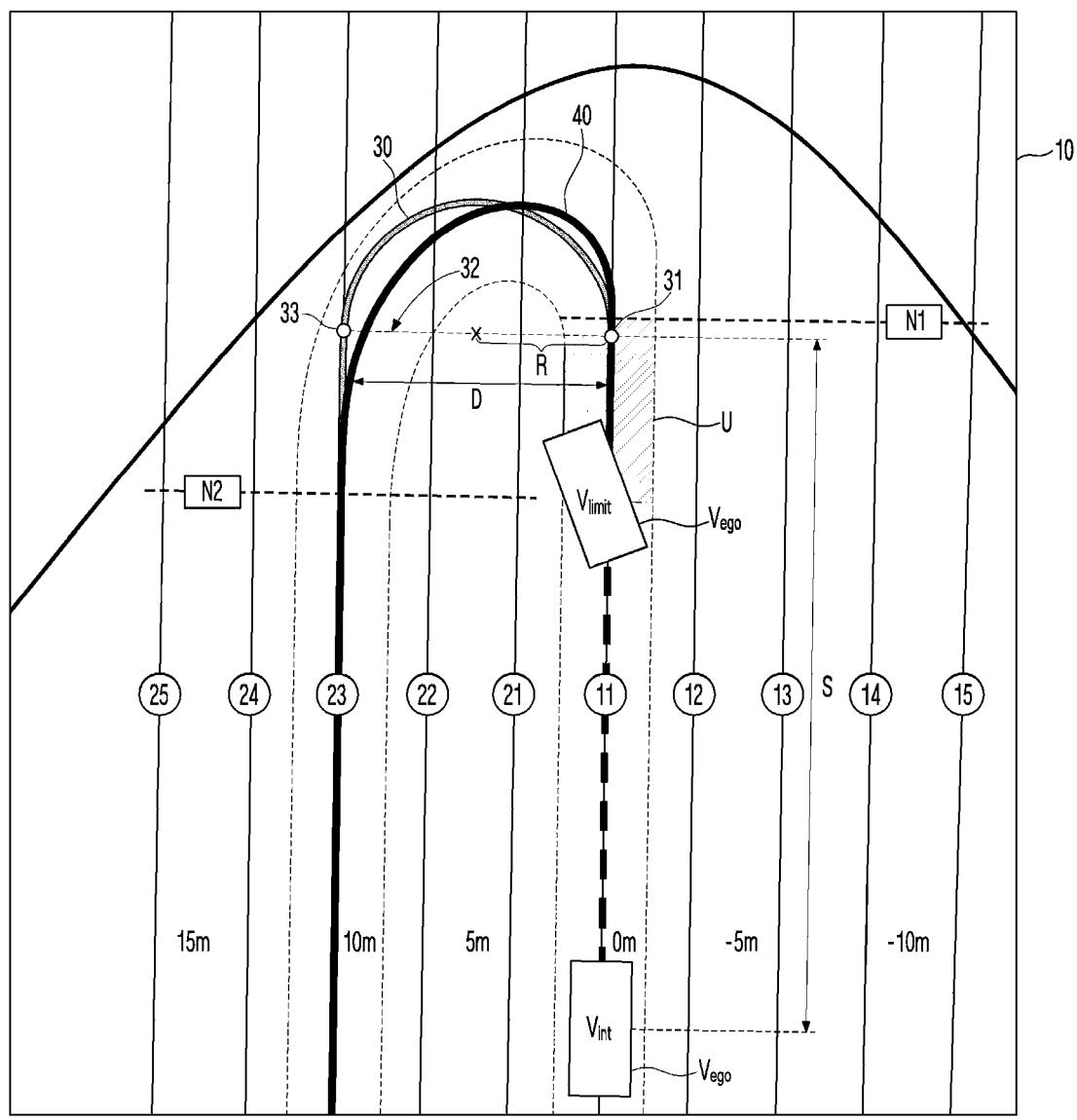
FIG. 2 illustrates a dynamic curvature route generated using a high-definition map according to various exemplary embodiments of the present invention.
Figure 3:
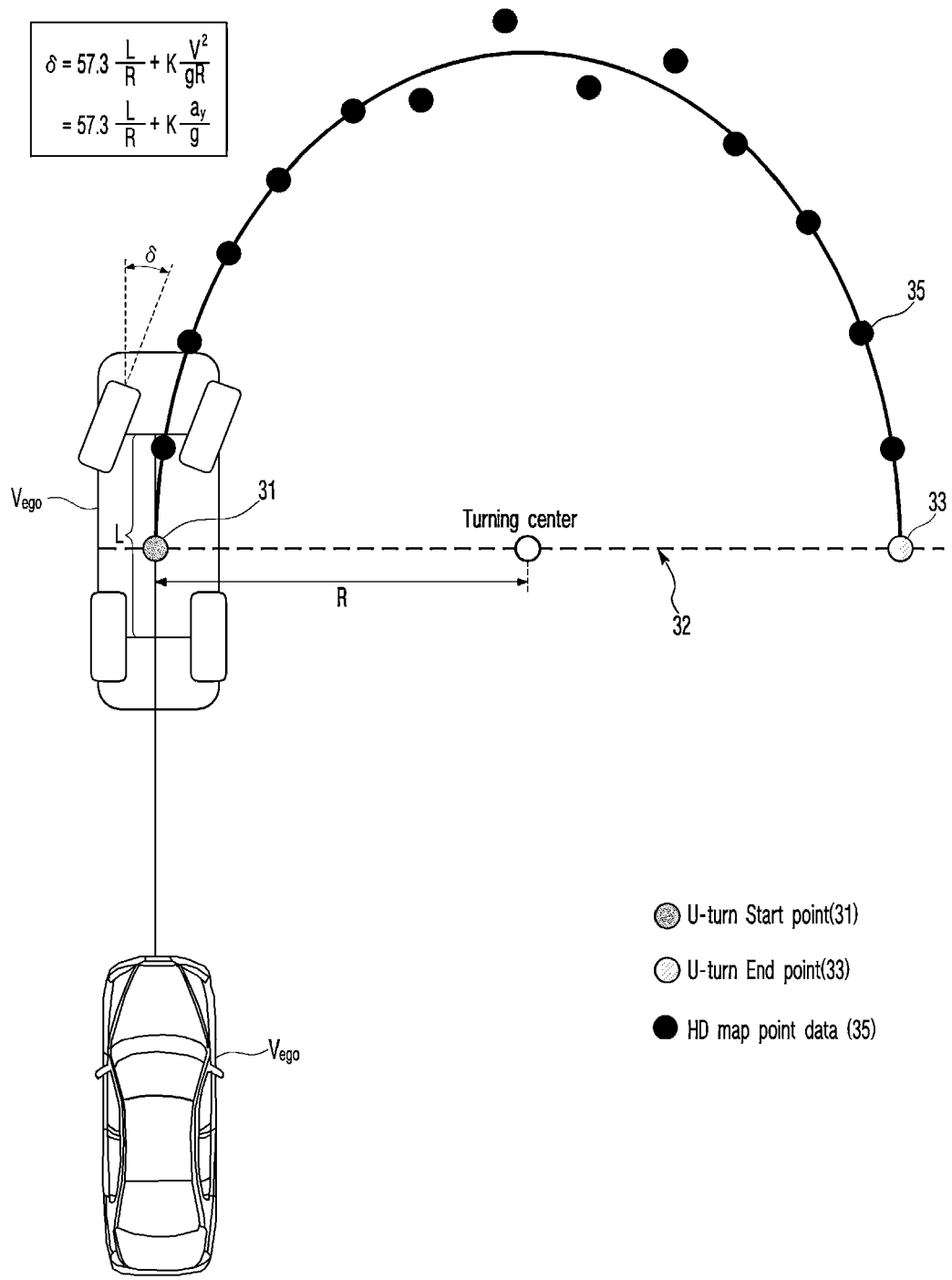
FIG. 3 is an enlarged view of the dynamic curvature route illustrated in FIG. 2.

FIG. 2 illustrates a dynamic curvature route generated using a high-definition map according to various exemplary embodiments of the present invention. FIG. 3 is an enlarged view of the dynamic curvature route illustrated in FIG. 2.

Referring to FIG. 2 and FIG. 3, the turning route generator 130 may recognize a U-turn section U located in front of the vehicle $V_{ego}$ which is autonomously traveling along a global route using collected sensor information. Here, the U-turn section U is a section indicated by a dotted line in a portion of a centerline of a road and includes an area between a node N1 and a node N2 that are separate from each other in a traveling direction of the vehicle $V_{ego}$ on the high-definition map 10.

The turning route generator 130 may detect a first point 31 in the U-turn section U using the high-definition map 10. Here, the first point 31 corresponds to a start point of a dynamic curvature route 30 and may be a point on a reference lane link 11 corresponding to a current position of the vehicle $V_{ego}$ among a plurality of lane links 11 to 15 and 21 to 25 forming the high-definition map 10.

The turning route generator 130 may determine a point at which the speed of the vehicle $V_{ego}$ can arrive at a turning reference speed $V_{limit}$ on the basis of the current vehicle speed $V_{ego}$ as the first point 31. Here, the turning reference speed $V_{limit}$ is a speed limit for preventing deviation of a vehicle traveling on a curved road due to centrifugal force and deterioration in ride comfort and may be set depending on a frictional coefficient of a road.

The turning route generator 130 may determine at least one candidate lane link 21 to 25 on the high-definition map 10 in consideration of steering limit of the vehicle $V_{ego}$, check risk of collision with respect to the at least one candidate lane link 21 to 25, and select a target lane link 23. For example, the turning route generator 130 may check a state (presence or absence of an obstacle) of the opposite lane of a lane in which the vehicle is traveling on the basis of sensor information and select a lane link having a low risk of collision as a target lane link.

The turning route generator 130 may extend a plumb line 32 from the first point 31 to the target lane link 23 and determine a point at which the plumb line 32 and the lane link 23 intersect as a second point 33. Here, the second point 33 corresponds to an end point of the dynamic curvature route 30, and the target lane link 23 may be parallel to the reference lane link 11.

The turning route generator 130 may determine a radius R of curvature on the basis of the distance between the first point 31 and the second point 33 and generate a dynamic curvature route 30 on the basis of the radius R of curvature. For example, the radius R of curvature may be half a straight distance between the first point 31 and the second point 33 (R=D/2). The dynamic curvature route 30 may correspond to a steady-state cornering trajectory.

The turning route generator 130 may obtain a reference route 40 by processing vector data collected from the high-definition map 10 through various function representations (n-order polynomial curve or B-spline curve) and sequentially using points 35 of the vector data.

The turning route generator 130 may determine whether the dynamic curvature route 30 corresponds to the reference route 40 by comparing the points on the dynamic curvature route 30 with the points on the reference route 40 and transmit the dynamic curvature route 30 along with a wake-up signal to the driving controller 140 according to a determination result.

The driving controller 140 may be activated upon reception of the wake-up signal from the turning route generator 130.

Thereafter, the driving controller 140 may align steering of the vehicle $V_{ego}$ on the basis of the reference lane link 11 and execute deceleration or acceleration control in consideration of a maximum deceleration $a_{max}$ in a first section between the current position and the first point 31.

The maximum deceleration $a_{max}$ may be determined in consideration of a current speed $V_{int}$ of the vehicle, the turning reference speed $V_{limit}$, and a distance S between the current position and the first point 31, as represented by the following equation 1, for example.

$$a_{max} = \frac{v_{int}^2 - v_{limit}^2}{2S} \qquad \text{[Equation 1]}$$

Furthermore, the driving controller 140 may execute turning control along the dynamic curvature route 30 while keeping a steering angle δ uniform in a second section between the first point 31 and the second point 32. The steering angle δ may be determined by the following equation 2 but this is merely an example.

$$\delta = 57.3 \frac{L}{R} + K \frac{v^2}{gR} \qquad \text{[Equation 2]}$$
$$= 57.3 \frac{L}{R} + K \frac{a_y}{gR}$$

Here, g is a gravitational acceleration, R is a radius of curvature, L is a wheelbase, v is a traveling speed, $a_y$ is a lateral acceleration, and K is an understeer gradient, and the traveling speed v and the steering angle δ may be kept uniform in the second section. Furthermore, the traveling speed v may be set to be the same as the limited turning reference speed $V_{limit}$ at the time of entering the second section.

The sensor information operation unit 150 may include a G sensor collector 151 and a lateral acceleration comparator 152.

The G sensor collector 151 may be provided in the vehicle, measure a longitudinal acceleration and a lateral acceleration of the vehicle $V_{ego}$ which is traveling in the second section, and provide measured data to the lateral acceleration comparator 152.

The lateral acceleration comparator 152 may determine a lateral acceleration using the maximum deceleration $a_{max}$ and the longitudinal acceleration and determine whether turning of the vehicle is in a normal state by comparing the determined value and the measured value of the lateral acceleration.

The lateral acceleration comparator 152 may compare a difference between the determined value and the measured value of the lateral acceleration with a predetermined reference value and determine whether the traveling state of the vehicle is a normal state or an abnormal state according to a comparison result.

For example, the lateral acceleration comparator 152 may determine the traveling state of the vehicle to be a normal state when the difference between the determined value and the measured value of the lateral acceleration is equal to or less than the predetermined reference value and determine the traveling state of the vehicle to be an abnormal state (including an oversteer state in which the vehicle oversteers an understeer state in which the vehicle understeers, for example) when the difference exceeds the predetermined reference value. Upon determining that the traveling state is an abnormal state, the lateral acceleration comparator 152 may transmit a fail flag to the driving controller 140 and the driving controller 140 may apply a compensation moment to a braking device.

The driving controller 140 may release the steering angle limited during the U-turn to control the target lane link to correspond to heading of the vehicle after the second section such that the vehicle can deviate from the dynamic curvature route 30.

According to various exemplary embodiments of the present invention, it is possible to prevent unnecessary steering change and perform turning traveling at a uniform speed by generating the dynamic curvature route 30 along which the vehicle $V_{ego}$ can maintain uniform steering angle with reference to point data in the high-definition map 10 during a U-turn, minimizing discomfort of a passenger.

FIG. 4 is a flowchart of a method for controlling a U-turn using a high-definition map according to various exemplary embodiments of the present invention.

According to the method for controlling a U-turn using a high-definition map, a U-turn section in front of a vehicle is recognized on the basis of sensor information (S410), and a first point in the U-turn section is detected using the high-definition map (S420). Here, the first point 31 may be a point on a reference lane link corresponding to a current position of the vehicle among a plurality of lane links forming the high-definition map.

Thereafter, at least one candidate lane link in which the vehicle will travel after the U-turn is determined S430, and a risk of collision with respect to the at least one candidate lane link is checked and a target lane link is selected (S440).

Accordingly, a plumb line extends from the first point to the target lane link and a point at which the plumb line and the target lane link intersect is determined as a second point (S450).

Thereafter, a radius of curvature is determined on the basis of a straight distance between the first point and the second point and a dynamic curvature route corresponding to a steady-state cornering trajectory (S460).

Accordingly, a reference route is obtained by processing vector data collected from the high-definition map, and then the number of points corresponding to each other between the reference route and the dynamic curvature route is detected (S470).

Thereafter, the detected number of points is compared with a predetermined threshold value N (here, N is an integer equal to or greater than 2) (S480).

Autonomous driving control is executed along the generated dynamic curvature route if the detected number of points is equal or less than N (S490), and the procedure returns to step S440 to re-select a target lane link if the detected number of points exceeds N.

The method for controlling a U-turn using a high-definition map according to the above-described embodiment may be realized as a program executed in a computer and stored in computer-readable recording media. Examples of computer-readable media include a ROM, a RAM, a CD-ROM, a magnetic tape, a floppy disk, an optical data storage device, etc.

A computer-readable recording medium is distributed to a computer system connected via a network, and computer-readable code may be saved and executed according to a distributed system. Furthermore, a function program, code, and code segments to realize the above-described method may be easily deduced by a person skilled in the art.

Although several embodiments have been described, these embodiments may be implemented in various other forms. Technical details of the above-described embodiments may be combined in various manners as long as they are not incompatible to realize new embodiments.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the present invention should be determined by the appended claims and their legal equivalents, not by the above description, and all changes coming within the meaning and equivalency range of the appended claims are intended to be embraced therein.

According to at least various exemplary embodiments of the present invention, it is possible to prevent unnecessary steering change and perform turning traveling at a uniform speed by generating a dynamic curvature route along which a steering angle of a vehicle may be kept uniform with reference to point data in a high-definition map during a U-turn, minimizing discomfort of a passenger.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling a U-turn of a vehicle using a high-definition map, the method comprising:
   recognizing, by processor of a U-turn control apparatus, a U-turn section of a road in front of the vehicle according to sensor information including vehicle's environment information detected by an external sensor and vehicle's state information measured by an internal sensor;
   detecting, by the processor of the U-turn control apparatus, a first point in the U-turn section using the high-definition map;
   determining, by the processor of the U-turn control apparatus, at least one candidate lane link on the high-definition map and selecting a target lane link from the at least one candidate lane link;
   determining, by the processor of the U-turn control apparatus, a second point on the target lane link based on the first point;
   generating, by the processor of the U-turn control apparatus, a dynamic curvature route based on the first point and the second point; and
   controlling, by the processor of the U-turn control apparatus, the vehicle based on the dynamic curvature route,
   wherein the generating of the dynamic curvature route includes determining a radius of curvature according to a distance between the first point and the second point and generating the dynamic curvature route on a basis of the determined radius of the curvature.

2. The method of claim 1, wherein the first point is a point on a reference lane link corresponding to a current position of the vehicle among a plurality of lane links and is determined in consideration of a current speed of the vehicle and a turning reference speed.

3. The method of claim 2, wherein the target lane link is parallel to the reference lane link.

4. The method of claim 2, further including determining, by the processor of the U-turn control apparatus, a steering angle of the vehicle using a radius of curvature in the dynamic curvature route and the turning reference speed.

5. The method of claim 1, wherein the dynamic curvature route corresponds to a steady-state cornering trajectory.

6. The method of claim 1, wherein the generating of the dynamic curvature route includes:
   obtaining a reference route according to the high-definition map; and
   determining whether points on the reference route correspond to points on the dynamic curvature route by comparing the points on the reference route with the points on the dynamic curvature route and controlling traveling of the vehicle according to a result of the determining whether the points on the reference route correspond to the points on the dynamic curvature route by comparing the points on the reference route with the points on the dynamic curvature route.

7. The method of claim 6, wherein the controlling of traveling of the vehicle includes:
   aligning steering of the vehicle on a basis of the reference lane link; and
   controlling a deceleration or an acceleration of the vehicle in consideration of a maximum deceleration in a first section between a current position of the vehicle and the first point.

8. The method of claim 7, wherein the controlling of traveling of the vehicle includes controlling turning of the vehicle along the dynamic curvature route on a basis of a determined steering angle in a second section between the first point and the second point,
   wherein the determined steering angle is kept uniform in the second section.

9. The method of claim 7, wherein the controlling of traveling of the vehicle includes causing the target lane link to correspond to heading of the vehicle after the second section.

10. The method of claim 1, wherein the selecting of the target lane link includes determining, by the processor of the U-turn control apparatus, the at least one candidate lane link in consideration of a steering limit of the vehicle.

11. The method of claim 1, wherein the selecting of the target lane link includes checking, by the processor of the U-turn control apparatus, a risk of collision of the vehicle with respect to the at least one candidate lane link and selecting the target lane link.

12. The method of claim 1, wherein the determining of the second point includes determining, by the processor of the U-turn control apparatus, an intersection of a plumb line of the first point and the target lane link as the second point.

13. A non-transitory computer-readable recording medium storing an application program executed by the processor of the U-turn control apparatus to realize the method of claim 1 for controlling the U-turn using the high-definition map.

14. A vehicle comprising:
a sensor information transmitter configured to obtain sensor information;
a turning route generator configured to generate a dynamic curvature route in a U-turn section of a road in front of the vehicle upon recognition of the U-turn section according to the sensor information; and
a driving controller configured to control traveling of the vehicle based on the dynamic curvature route,
wherein the sensor information transmitter includes an external sensor that detects environment information around the vehicle and an internal sensor that measures state information of the vehicle, and
wherein the turning route generator is configured:
to detect a first point in the U-turn section using a high-definition map;
to determine at least one candidate lane link on the high-definition map and to select a target lane link from the at least one candidate lane link;
to determine a second point on the target lane link based on the first point;
to determine a radius of curvature according to the first point and the second point; and
to generate the dynamic curvature route based on the determined radius of curvature.

15. The vehicle of claim 14, wherein the turning route generator is configured to determine the at least one candidate lane link in consideration of a steering limit of the vehicle.

16. The vehicle of claim 14, wherein the turning route generator is configured to check a risk of collision of the vehicle with respect to the at least one candidate lane link and to select the target lane link.

17. The vehicle of claim 14, wherein the turning route generator is configured to determine an intersection of a plumb line of the first point and the target lane link as the second point.

18. The vehicle of claim 14,
wherein the turning route generator is configured to obtain a reference route on a basis of the high-definition map, and
wherein the driving controller is configured to determine whether points on the reference route correspond to points on the dynamic curvature route by comparing the points on the reference route with the points on the dynamic curvature route and to control traveling of the vehicle according to a result of the determining whether the points on the reference route correspond to the points on the dynamic curvature route by comparing the points on the reference route with the points on the dynamic curvature route.

* * * * *